(No Model.)

J. DALZELL, Jr.
CROSSCUT SAW HANDLE.

No. 540,726. Patented June 11, 1895.

Witnesses:
Henry Dalzell
Samuel Smedley

Inventor:
John Dalzell Jr

UNITED STATES PATENT OFFICE.

JOHN DALZELL, JR., OF NORRISVILLE, MICHIGAN.

CROSS-CUT-SAW HANDLE.

SPECIFICATION forming part of Letters Patent No. 540,726, dated June 11, 1895.

Application filed March 26, 1894. Serial No. 505,212. (No model.)

*To all whom it may concern:*

Be it known that I, JOHN DALZELL, Jr., a citizen of the United States, residing at Norrisville, in the county of Leelanaw and State of Michigan, have invented a new and useful Cross-Cut-Saw Handle, of which the following is a specification.

Figure 2:
Figure 1:
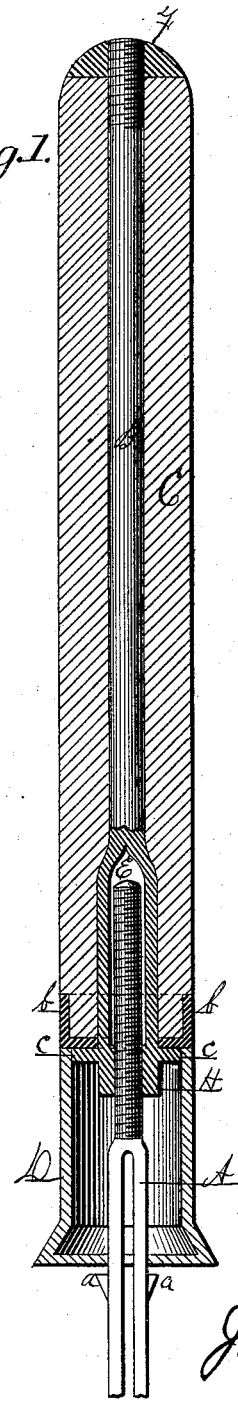
Figure 3:

In the accompanying drawings, Figure 1 is a longitudinal section of the saw-handle; and Figs. 2 and 3, detail views of the saw-holding loop and the securing-bolt, respectively.

First. The wooden part of said handle is ten inches long, and one and one-fourth inches in diameter, round in form, and sized to fit ferrule, with a five-eighth inch round hole in lower end, two inches deep, and a three-eighth inch round hole the balance of the way through.

Second. One round nut one inch in diameter, round, flat on lower side, and rounding on the upper side, with a three-eighth inch thread cut hole in same to be used on main bolt.

Third. Ferrule to fit on lower end of wooden part of handle, which is one and one-fourth inches in diameter on outside; one inch on inside, and one-half inch deep, closed at lower end, except five-eighth inch hole in center for main bolt to go in.

Fourth. *Main bolt.*—(A) One piece three-eighth inch rod iron, ten inches in length, with thread cut on upper end of rod, one inch in length; the other end of the rod split in the center two and one-half inches in length, and spread to a width of five-eighths of an inch from outside to outside; the inside cut and trimmed to a uniform width of three-eighths of an inch to admit a three-eighths inch bolt (the upper end of loop), with threads cut on inside of opening one-half inch from lower end. (b) One piece of round iron in the shape of a washer one inch in diameter, one-eighth of an inch in thickness with a five-sixteenth inch hole in center, with a piece of square iron in the shape of a nut three-fourths of an inch square and one-fourth of an inch in thickness with a five-sixteenth hole in center, welded or brazed on split end of the round piece of iron, or main bolt, the holes of the two pieces coming evenly together, forming one solid nut, with a thread cut the entire length of the whole running through the center; and this to be fastened on the lower end of main bolt (A) by welding the round or washer part on the lower end of the main bolt; the square part of the nut being for the purpose of using the wrench in loosening or tightening ferrule to the handle; the round or washer part serving as a shoulder to ferrule or head of bolt; all of said nut being covered by a thimble.

Fifth. The thimble is two and one-half inches long, one and one-fourth inches at top end and one and one-half inches at the other with a hollow of one inch, leaving it one-eighth of an inch thick all round. The lower or large end is closed, or has a head in one-fourth of an inch from the end, one-sixteenth of an inch thick, with one-half inch square hole in the center (for loop to go in). The outside of thimble does not taper any until within one-half inch of the bottom. Thimble is held in place by the loop or by the round part of the head of main bolt.

Sixth. The loop is a piece of flat square cornered iron eight inches long, one-half inch wide, double in center, and of the same thickness of saw plate, about one-eighth inch in thickness; making this part of the loop square, together with a piece of three-eighth inch bolt threaded and welded between open end with two projections (or lugs) *a—a* to hold the thimble to the handle when it is off from the saw, which completes the handle.

I do not claim wooden part of handle.

What I claim as new, and desire to secure by Letters Patent, is—

1. In a saw handle, the combination with the handle proper of the bolt passing through such handle threaded at one end and having an internally screw threaded socket formed at its other end, the bolt being split and laterally expanded back from said socket, a saw-holding loop having a screw threaded shank engaging said socket and adjusting into the expanded portion of the bolt, and a nut for the screw threaded end of the bolt substantially as set forth and described.

2. The loop A. provided with the projections *a a*, loop nut H. and screw space E. and thimble D. thimble guide *c c* in combination with the bolt B. handle C. and ferrule *b b* and nut F. as and for the purpose specified.

JOHN DALZELL, JR.

In presence of—
LEE HORNSBY,
WILL DALZELL.